No. 693,512. Patented Feb. 18, 1902.
W. J. GOULD.
CREAM SEPARATOR.
(Application filed Sept. 14, 1901.)
(No Model.)
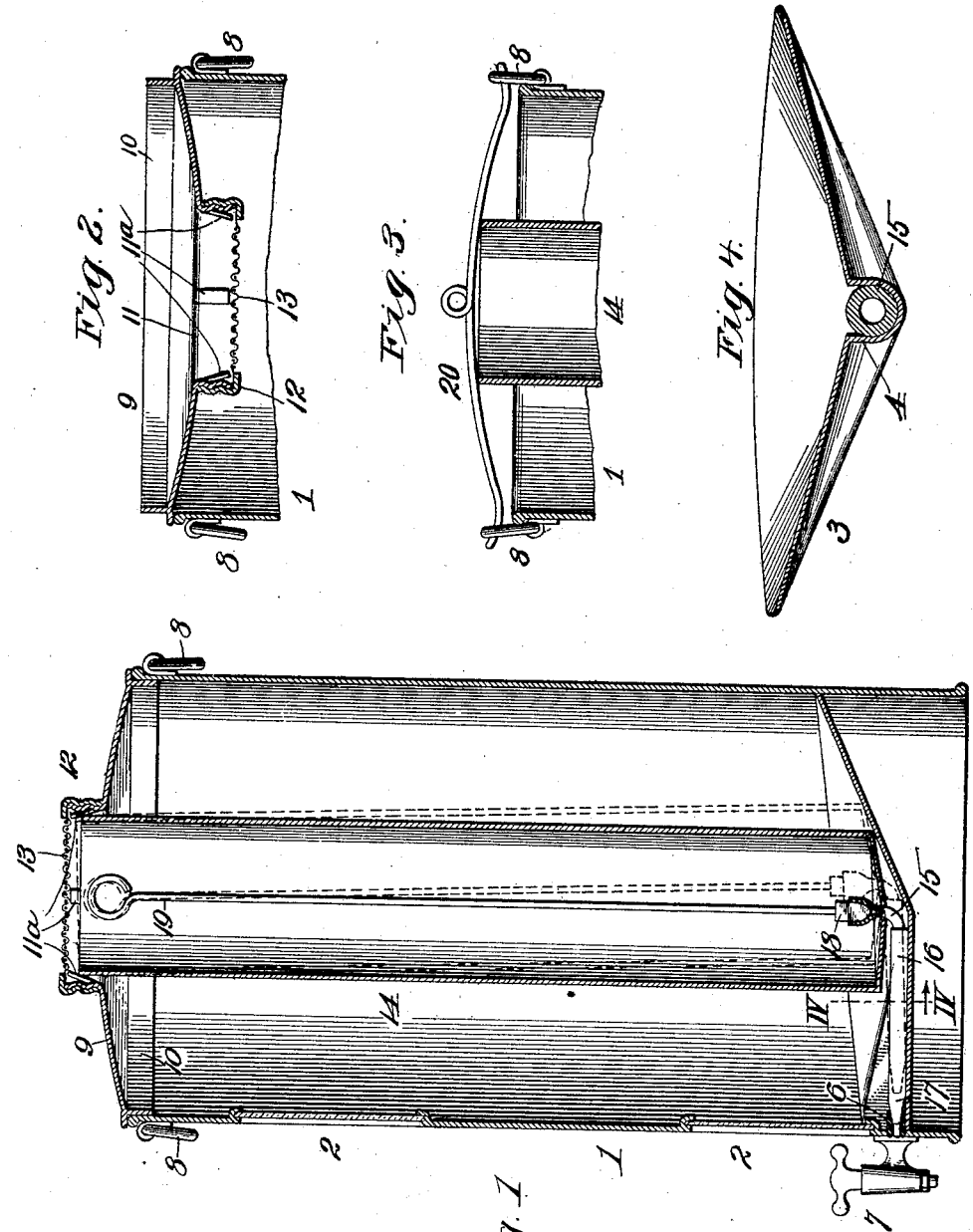
Witnesses:
Arthur McArthur
H. C. Rodgers.
Inventor:
Wm. J. Gould.
By Fischer & Thorpe
Attys.
THE NORRIS PETERS CO., PHOTO-LITHO., WASHINGTON, D. C.

UNITED STATES PATENT OFFICE.

WILLIAM J. GOULD, OF ARGENTINE, KANSAS, ASSIGNOR OF ONE-HALF TO WM. S. WEYER, OF KANSAS CITY, MISSOURI.

CREAM-SEPARATOR.

SPECIFICATION forming part of Letters Patent No. 693,512, dated February 18, 1902.

Application filed September 14, 1901. Serial No. 75,430. (No model.)

*To all whom it may concern:*

Be it known that I, WILLIAM J. GOULD, a citizen of the United States, residing at Argentine, in the county of Wyandotte and State of Kansas, have invented certain new and useful Improvements in Cream-Separators, of which the following is a specification.

My invention relates to cream-separators of that class whereby the setting of the cream can be effected by simply cooling without diluting or by diluting the milk, whereby the cooling-cylinder can be emptied of and recharged with water without interfering with the milk and cream and whereby the milk and cream can be discharged without requiring the discharge of the water in the cooling-cylinder; and my object is to produce a device of this character which is efficient in operation and of simple, durable, and inexpensive construction.

With this object in view and others as hereinafter appear the invention consists in certain novel and peculiar features of construction and combinations of parts, as hereinafter described and claimed, and in order that it may be fully understood reference is to be had to the accompanying drawings, in which—

Figure 1 is a central vertical section of a device embodying my invention. Fig. 2 is a similar view of the upper part of the device, but with the cover inverted to act as a strainer for the milk poured therein. Fig. 3 is a similar view to illustrate—the cover being removed—how the cylinder is emptied of water without floating to the top of and disturbing the milk and cream. Fig. 4 is an enlarged section taken on line IV IV of Fig. 1.

In the said drawings, 1 designates the can, of cylindrical form by preference and provided with a pair of vertically-alined sight-panes 2 2 for the usual purpose. The bottom of the can is in the form of a shallow inverted cone 3, having a radial depression, which provides a trough 4, wherein projects the stem 6 of a faucet 7, secured to the lower end of the can, and in order that the trough shall be the lowest part of the can-bottom the latter is tilted downward toward the faucet to render the production of the trough therein easier to manufacture—that is to say, by tilting the bottom it can be made very cheaply and yet have the outer end of the trough as low as its inner end, which is coincidental with the apex of the bottom. Diametrically opposite points near the upper end of the can are provided with pivoted loops or handles 8, which enable the can to be conveniently carried and also serve another function hereinafter mentioned.

9 designates the cover, the same embracing the vertical flange 10 to fit within the can. It is also provided with a central opening surrounded by a screw-neck 11, at the inner side of which are formed a number of upwardly-converging spring-arms $11^a$ for a purpose which hereinafter appears, and screwed upon said neck is a cap 12, the crown 13 of which is composed of wire-gauze or equivalent material, so that it may serve as a strainer for the milk, as hereinafter explained, or as a ventilating-point for the entrance of air and the exit of heat during the cream-setting operation.

14 designates a cooling-cylinder of length to extend from can-bottom 3 up into the cover-neck 11 and of diameter to fit loosely in the latter and press slightly against the spring-arms $11^a$, so as not to impede the free escape of the animal heat given up by the milk, and yet be held yieldingly in an upright position. Its lower end rests upon the can-bottom and bridges the inner end of the trough 4, as shown clearly in Fig. 1, in order that the elbow-pipe 15, secured in the bottom of said cooling-cylinder, and the radial tube 16, carried by said elbow-tube, may occupy the trough, the front end of said radial tube being tapered, as at 17, so that it can be easily inserted in stem 6 of the faucet when submerged in and therefore hidden from view by the milk in can 1. The upper end of elbow-pipe 15 is enlarged, so as to form a convenient and secure seat for the valve or plug 18, located in the cooling-cylinder and provided with a vertical rod or handle 19, extending nearly to the top of said cylinder.

When ready to begin the process of separating the cream from the milk, the cover 9 and the cooling-cylinder are removed from the can, tube 16, attached to elbow-tube 15, of course accompanying the cooling-cylinder. The cover is then replaced in an inverted position, so that it forms a receptacle or funnel wherein the milk may be conveniently poured, the strainer at the bottom of said receptacle or funnel preventing foreign matter contained in the milk from entering the can. After the can is thus charged the inverted cover is removed. The cooling-cylinder is now charged with cold water—ice may be added, if desired—and deposited in the can, being turned or twisted slightly until tube 16 enters trough 4. The can is then shifted at its lower end until the tapered end of said tube enters the stem of the faucet. The cover is now placed in position, and its guide-arms 11ª prevent the cylinder from moving sidewise, and thereby straining the tube 16 and the contiguous parts. After a sufficient time has elapsed for the cream to be completely separated from the milk the person in charge removes the cover and shifts the cooling-cylinder to about the position shown in dotted lines, Fig. 1, thereby withdrawing tube 16 from direct connection with the faucet and enabling the milk and cream to be successively withdrawn through the faucet without an accompanying discharge on the part of the water contained in the cooling-cylinder. The cover is now placed upon the can, and the spring-arms accommodate the slightly different position which the cooling-can occupies when tube 16 is withdrawn.

In the process of separating the cream from the milk by diluting the latter the cylinder occupies the position shown by dotted lines, Fig. 1, so that when the valve or plug 18 is removed the water enters the milk at the bottom of the can. Where it is not desirable to dilute the milk and yet hasten the separating action as much as possible, the operator, assuming the parts are in the position shown in full lines, Fig. 1, opens faucet 7 and withdraws valve or plug 18. This effects the discharge of the water in the cylinder, which by conduction has become as warm, perhaps, as the milk, and therefore largely lost its effectiveness. After the faucet is closed and the valve reseated the cooling-cylinder may be charged with fresh water, and this operation may be repeated with ease and despatch as many time as desired. Before, however, the discharge of water from the cylinder takes place it is necessary to remove cover 9—or at least it is advisable to do so—swing handles 8 to an upright position, as shown in Fig. 3, and then hook through said loops or handles the ends of a spring-bar 20, this spring-bar bridging the cylinder, so as to resist any upward movement of the same as the latter, by the discharge of its contents, becomes lighter than the milk, it being obvious that as thus lightened the milk will tend to float it upward.

From the above description it will be apparent that I have produced a cream-separator which embodies the features of advantage enumerated as desirable in the statement of invention, and while I have illustrated and described the preferred embodiment of the same it is to be understood that I reserve the right to make all changes in its form, proportion, detail construction, and organization which properly fall within the spirit and scope of the appended claims.

Having thus described the invention, what I claim as new, and desire to secure by Letters Patent, is—

1. A cream-separator, comprising a can having an inverted conical bottom formed with a radially-extending trough, a faucet secured in the side of the can with its stem registering with said trough, a cooling-cylinder supported within the can and provided with a discharge-tube which occupies said trough and detachably engages the faucet-stem, and a valve or plug controlling the discharge from said cooling-cylinder through said tube, substantially as described.

2. In a cream-separator, the combination of the can, provided with a discharge-faucet, the can-cover having a central neck-opening, upwardly-converging spring-arms therein, and a foraminous crown above said arms, and an inner can suitably supported and free to be moved laterally at its lower end and having a discharge-tube adjustably engaging the faucet; said inner can also having its upper end centered in the neck-opening by said spring-arms, substantially as described.

In testimony whereof I affix my signature in the presence of two witnesses.

WILLIAM J. GOULD.

Witnesses:
H. C. RODGERS,
G. Y. THORPE.